United States Patent
Uenishi

(10) Patent No.: US 9,815,125 B2
(45) Date of Patent: Nov. 14, 2017

(54) MACHINE TOOL

(71) Applicant: FANUC Corporation, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 14/819,496

(22) Filed: Aug. 6, 2015

(65) Prior Publication Data

US 2016/0039014 A1 Feb. 11, 2016

(30) Foreign Application Priority Data

Aug. 7, 2014 (JP) .................................. 2014-161088

(51) Int. Cl.
B23C 1/14 (2006.01)
G05B 19/402 (2006.01)
G05B 19/4093 (2006.01)
B23C 3/18 (2006.01)

(52) U.S. Cl.
CPC .............. *B23C 1/14* (2013.01); *G05B 19/402* (2013.01); *G05B 19/40938* (2013.01); *B23C 3/18* (2013.01); *G05B 2219/45145* (2013.01); *G05B 2219/50312* (2013.01); *G05B 2219/50353* (2013.01); *Y02P 90/265* (2015.11)

(58) Field of Classification Search
CPC .......... B23C 1/14; B23C 3/18; G05B 19/402; G05B 2219/45145; G05B 2219/50353; G05B 19/40938; G05B 2219/50312; Y02P 90/265
See application file for complete search history.

(56) References Cited

U.S. PATENT DOCUMENTS

| 2002/0055805 | A1 | 5/2002 | Matsumoto et al. |
| 2002/0077233 | A1* | 6/2002 | Oldani ............ B23Q 1/52 483/55 |
| 2014/0180465 | A1* | 6/2014 | Nakano ............ G05B 19/4097 700/160 |

(Continued)

FOREIGN PATENT DOCUMENTS

| CN | 102291073 A | 12/2011 |
| CN | 103901815 A | 7/2014 |
| JP | H05-8148 A | 1/1993 |

(Continued)

OTHER PUBLICATIONS

Decision to Grant a Patent in JP Patent Application No. 2014-161088, dated Nov. 17, 2015.

(Continued)

*Primary Examiner* — Miranda Huang
*Assistant Examiner* — John Park
(74) *Attorney, Agent, or Firm* — Hauptman Ham, LLP

(57) ABSTRACT

A machine tool includes a linear movement axis for moving a main spindle, at least two linear movement axes for moving a table, and a rotation table including at least one rotation axis, the rotation table being placed on the table. A numerical controller performs machining by executing a machining program for tool center point control where the tool orientation is fixed to a certain axis or a certain surface, and by changing the tool orientation by controlling each axis of the machine tool based on set tool use range and tool orientation change waveform pattern.

3 Claims, 17 Drawing Sheets (a) TOOL USE RANGE: 10~80° R5.0BALL END MILL
(b) AT THE START OF MACHINING 80°
(c) AT THE END OF MACHINING 10°

CASE OF R5.0 BALL END MILL, WHERE ROTATION SPEED IS 2000 rpm
80° POSITION, φ 9.848, CUTTING SPEED 62 m/min
10° POSITION, φ 1.736, CUTTING SPEED 11 m/min
ABOUT SIXFOLD CUTTING SPEED DIFFERENCE IS PRESENT

(56) References Cited

U.S. PATENT DOCUMENTS

2015/0205284 A1    7/2015  Fujino et al.

FOREIGN PATENT DOCUMENTS

| JP | 8-229770 A | 9/1996 |
| JP | 2002-096243 A | 4/2002 |
| JP | 2006-53789 A | 2/2006 |
| WO | 2014/016943 A1 | 1/2014 |

OTHER PUBLICATIONS

Office Action in CN Application No. 201510484144.3, dated Feb. 7, 2017.

* cited by examiner

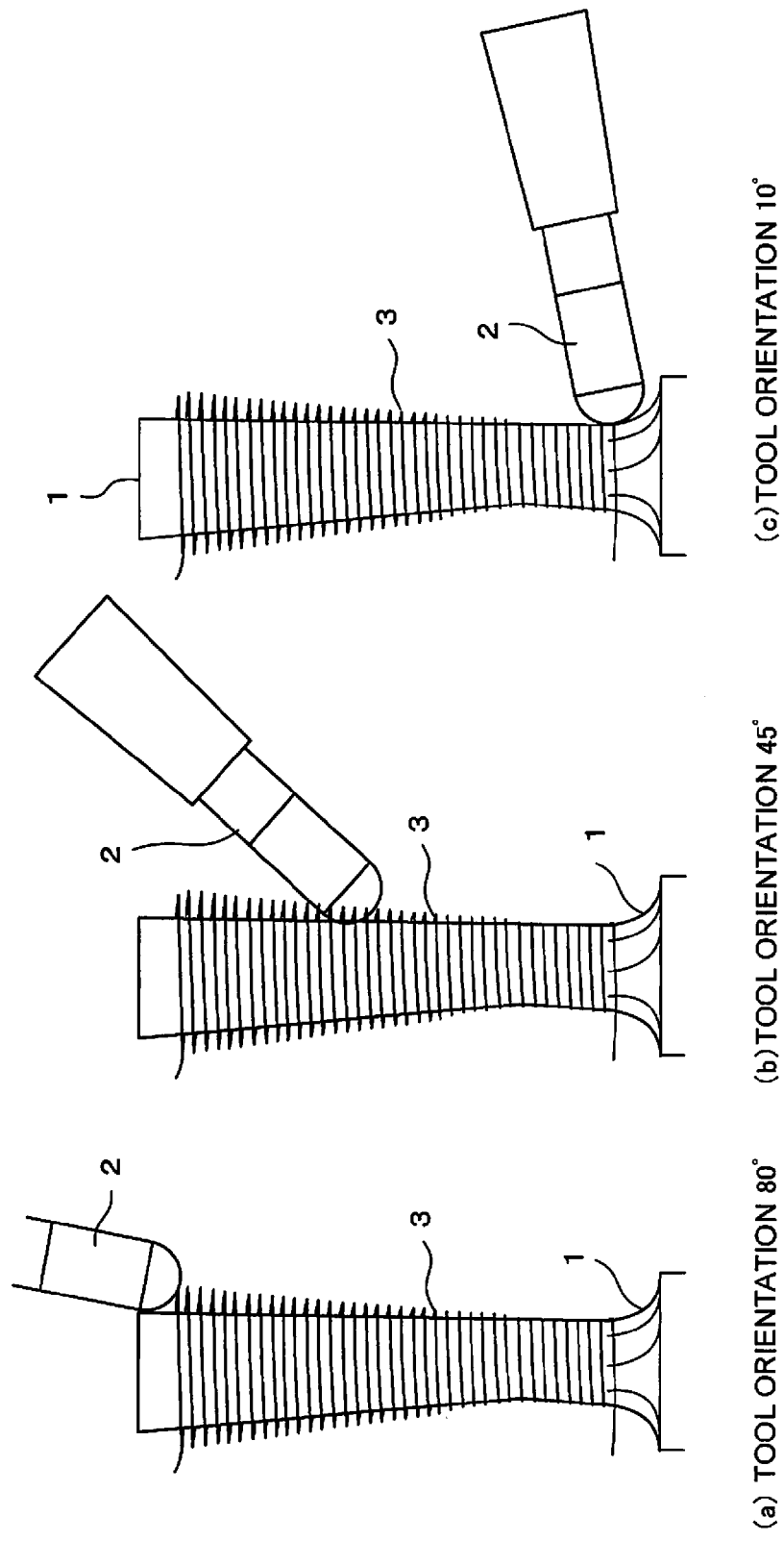

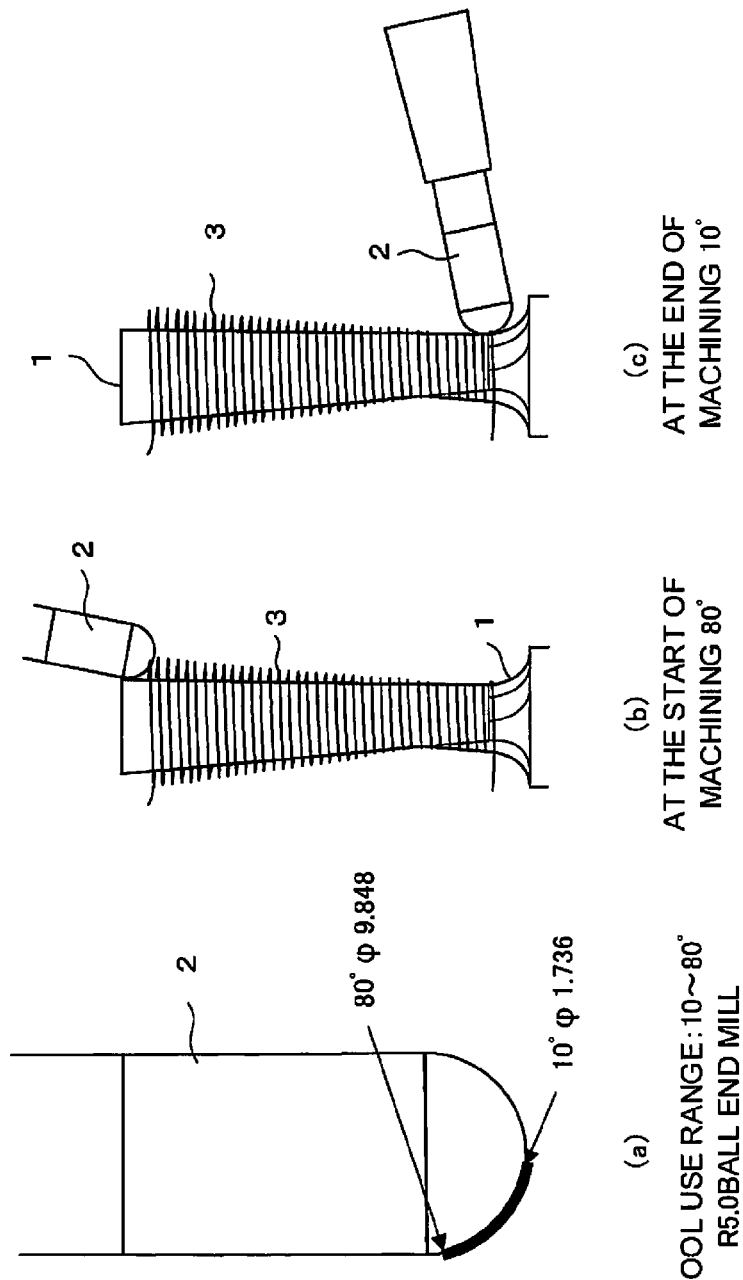

TOOL ORIENTATION 80°

80° POSITION
CONTACT TOOL OUTER DIAMETER  φ 9.848
MAIN SPINDLE ROTATION SPEED  S2000rpm
FEED SPEED  F200mm/min
  ⇒CUTTING SPEED 62m/min

TOOL ORIENTATION 10°

10° POSITION
CONTACT TOOL OUTER DIAMETER  φ 1.736
MAIN SPINDLE ROTATION SPEED  S11350rpm
FEED SPEED  F1135mm/min
  ⇒CUTTING SPEED 62m/min

FIG.8A

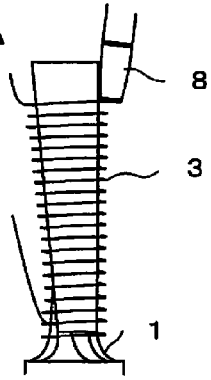

TOOL ORIENTATION AT φ 8.0 PART

CONTACT TOOL OUTER DIAMETER  φ 8.0
MAIN SPINDLE ROTATION SPEED     S2000rpm
FEED SPEED   F200mm/min
  ⇒CUTTING SPEED 50m/min

FIG.8B

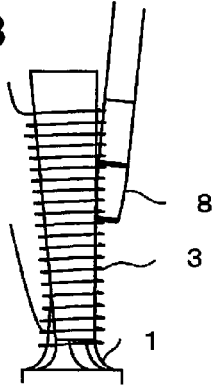

TOOL ORIENTATION AT φ 7.0 PART

CONTACT TOOL OUTER DIAMETER  φ 7.0
MAIN SPINDLE ROTATION SPEED     S2290rpm
FEED SPEED   F229mm/min
  ⇒CUTTING SPEED 50m/min

FIG.8C

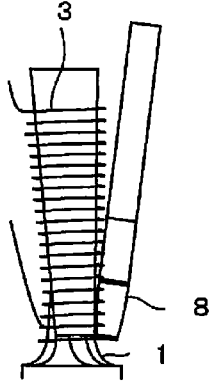

TOOL ORIENTATION AT φ 6.0 PART

CONTACT TOOL OUTER DIAMETER  φ 6.0
MAIN SPINDLE ROTATION SPEED     S2670rpm
FEED SPEED   F267mm/min
  ⇒CUTTING SPEED 50m/min FIG.9
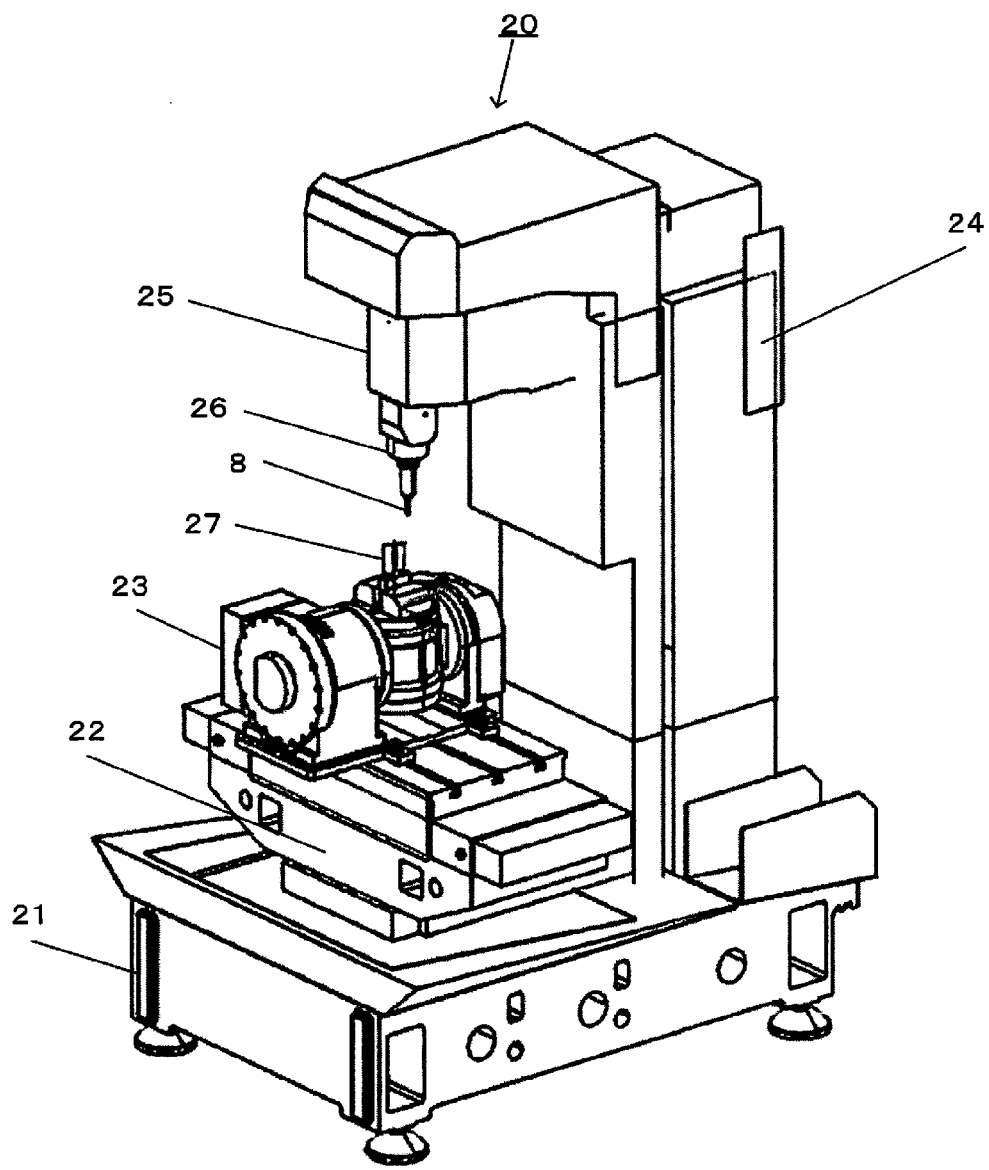
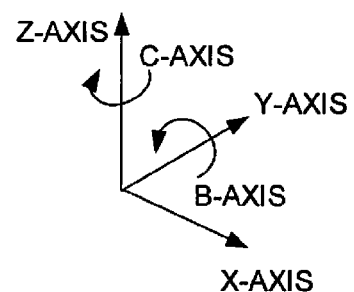

FIG.10
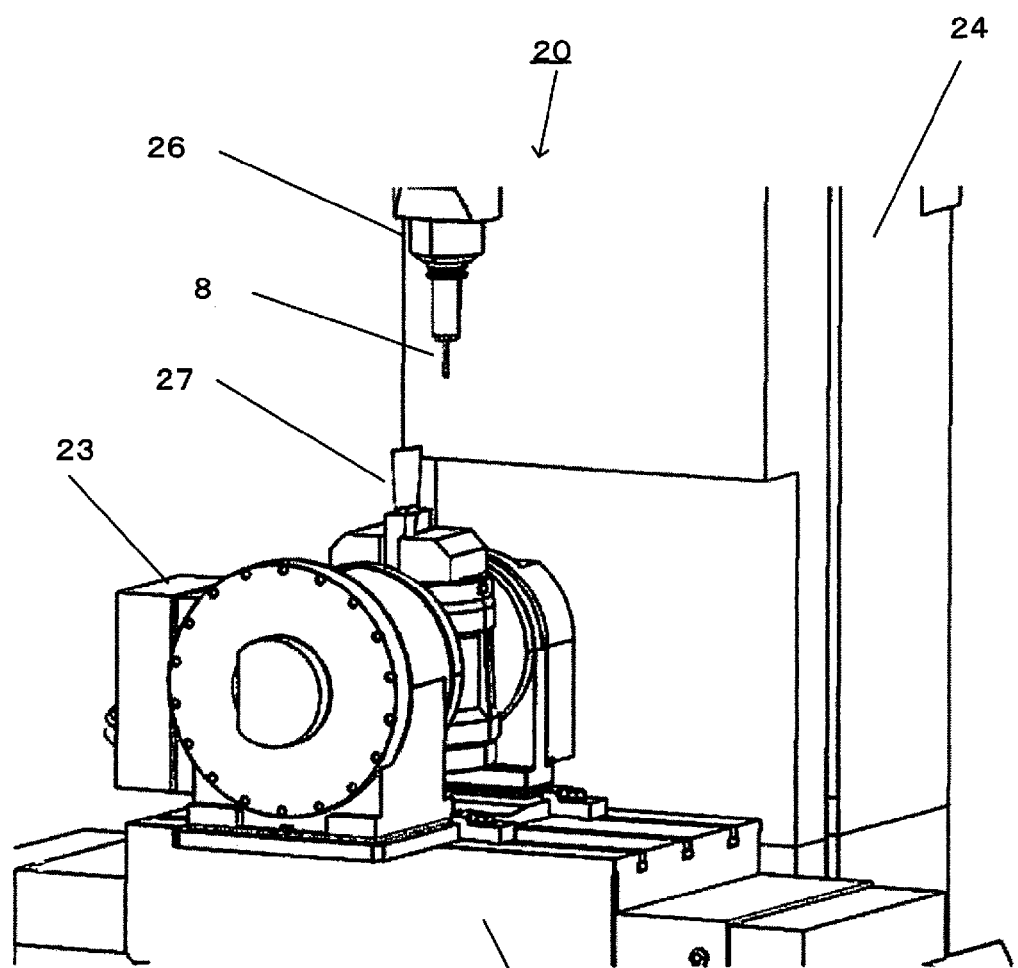
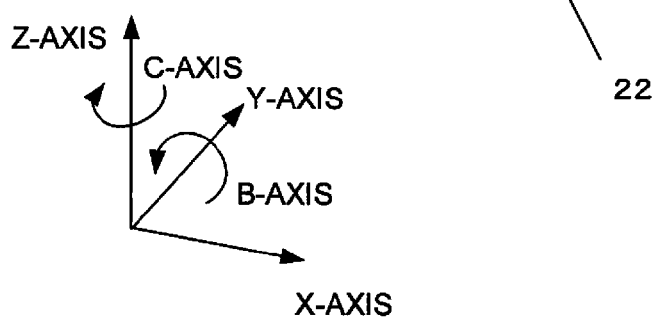

MACHINE TOOL
LINEAR MOVEMENT AXES: 3 AXES OF X-AXIS, Y-AXIS, Z-AXIS
ROTATION TABLE TILT: B-AXIS (ROTATION AXIS DIRECTION IS PARALLEL TO Y-AXIS)
ROTATION TABLE TILT: C-AXIS (ROTATION AXIS DIRECTION IS PARALLEL TO Z-AXIS)

PROGRAM FORMAT FUNCTION ON (101)
M303 R100. D8. B7. S6. E8. V3. W1. K1.

H=152.018−80.92=71.098

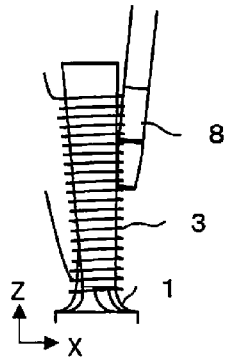

(a) CONSTANT TOOL ORIENTATION AT φ 7.0

FIG.11B
CHANGE IN TOOL ORIENTATION
E = φ 8.0
E = φ 6.0
Hp = 0
Dc = 6.0
θ τ(B-AXIS) = −2.3776
V1(X-AXIS) = 0.1011
V2(Z-AXIS) = 4.0250
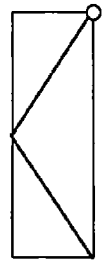
(b) TOOL ORIENTATION AT φ 6.0 PART
Hp = 35.549
Dc = 8.0
θ τ(B-AXIS) = 5.7320
V1(X-AXIS) = −0.9289
V2(Z-AXIS) = −9.9875
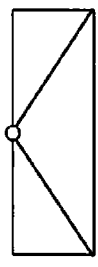
(c) TOOL ORIENTATION AT φ 8.0 PART
Hp = 71.098
Dc = 6.0
θ τ(B-AXIS) = −2.3776
V1(X-AXIS) = 0.1011
V2(Z-AXIS) = 4.0250
(d) TOOL ORIENTATION AT φ 6.0 PART

FIG.13A

PROGRAM FORMAT FUNCTION ON (101)
M303 R_ D_ B_ S_ E_ V_ W_ K_

PROGRAM FORMAT FUNCTION OFF (102)
M305

R : BARREL RADIUS [mm]
D : TOOL DIAMETER [mm]
B : REFERENCE MACHINING ORIENTATION TOOL DIAMETER [mm]
S : TOOL USE RANGE (START) [mm]
E : TOOL USE RANGE (END) [mm]
V : MACHINING DIRECTION VECTOR   INSTRUCTION VALUE 1:X, 2:Y, 3:Z
W : TOOL ORIENTATION CHANGE WAVEFORM PATTERN   INSTRUCTION VALUE 1, 2
K : NUMBER OF TIMES OF ORIENTATION CHANGE [TIMES]

FIG.13C

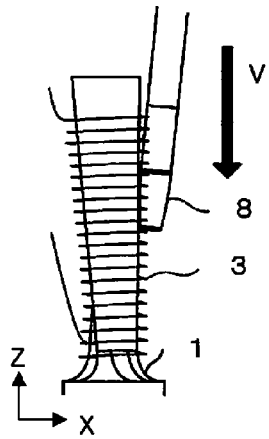

TOOL ORIENTATION AT φ 7.0

FIG.13D

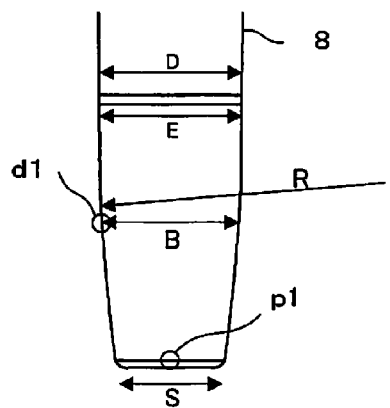

FIG.13B

```
                        ~ 9
%
O1000
G80 G40 G69 G17
G49 M06 T01
G90 G00 G54 X0 Y0 B0 C0
G43.4 Z200.0 H1M03S2000
B35.343C56.467            PROGRAM FORMAT FUNCTION ON (101)
X-1.598Y-2.411Z4.079
X20.308Y-24.111Z161.275
X23.324Y-19.56Z153.576
M303 R100. D8. B7. S6. E8. V3. W1. K1
G01X23.562Y-18.411Z152.018F250
X23.113Y-17.041Z150.703
X22.046Y-15.661Z149.831
X20.522Y-14.479Z149.535
X17.67Y-12.691Z149.596B34.624C59.178
X14.73Y-11.035Z149.662B33.875C61.883
X11.714Y-9.519Z149.73B33.095C64.588     MACHINING PATH PROGRAM (10)
...
...
...
X26.667Y-9.119Z80.968B34.95C-264.504
X25.248Y-9.103Z80.932B35.375C-276.52
X23.872Y-8.798Z80.92B35.512C-288.54
M305
X21.957Y-8.574Z81.218       PROGRAM FORMAT FUNCTION OFF (102)
X20.229Y-8.812Z82.092
X18.951Y-9.477Z83.408
X18.317Y-10.466Z84.965
G00X13.626Y-24.454Z105.64

G80G49G40M09
G91G28Z0.0M05
G28X0.0Y0.0M09
G28B0.0C0.0
M30
```

MACHINE TOOL

RELATED APPLICATIONS

The present application claims priority to Japanese Application Number 2014-161088, filed Aug. 7, 2014, the disclosure of which is hereby incorporated by reference herein in its entirety.

BACKGROUND OF THE INVENTION

Field of the Invention

The present invention relates to a machine tool capable of increasing the tool life by causing a machining program for tool center point control at a certain tool orientation to operate and performing machining while changing the tool orientation based on a set tool use range and tool orientation change waveform pattern.

Description of the Related Art

A machining center provided with a main spindle fixed on a linear movement axis or a rotation axis, a table, for fixing a workpiece, having one or more linear movement axes or rotation axes, and a numerical controller for controlling the main spindle and the linear movement axis and the rotation axis of the table is known.

Generally, a turbine blade, which is one of turbine components used for an aircraft or an electric generator, is machined by a machining center having three linear movement axes and at least one rotation axis. As shown in FIG. 1A showing a turbine blade shape and FIG. 1B showing a machining path, in the case of machining based on simultaneous control of the linear movement axes and the rotation axis by a micro linear instruction, as in the case of semi-finishing machining or a finishing machining in contour machining of the turbine blade or the like (machining shape 1), helical machining is performed along the machining path shown by a machining path 3 by using a side surface of a ball end mill (a tool 2) at a certain tool orientation with respect to a workpiece machined surface. Such a machining method generally uses a tool center point control function.

The machining method described above is not for turbine blades alone, and is a general machining method used in contour machining using a linear movement axis and a rotation axis. In the machining method as shown in FIGS. 1A and 1B, a method is often adopted, by CAM software, of creating a machining program by determining, with respect to a certain axis, a certain surface or a certain machined surface, a tool orientation by taking, as shown in FIGS. 2A and 2B, an angle formed by a tool axis 4 and the movement direction of a tool (a tool movement direction 5) with respect to the tool movement direction 5 and a plane perpendicular to the tool movement direction 5 as a lead angle 6, and an angle formed by the tool axis 4 and a line segment of intersection of the surface of the machining shape 1 and a plane perpendicular to the tool movement direction 5 as a tilt angle 7.

However, as shown in FIG. 3, with this machining method, the same part of the blade of the tool machines the workpiece at all times, and wear of the tool progresses only at one part. The reference sign 2a indicates the part of a tool 2 where wear progresses due to use. Especially, since machining of a turbine blade or the like uses a metal called a heat-resistant alloy, such as a nickel-based alloy, with extremely poor machinability, wear of the tool progresses rapidly. Accordingly, machining conditions have to be lowered, or the tool has to be replaced. As a result, the tools may become very costly, and also, a step may be produced on the machined surface due to tool exchange and may result in product failure, and thus efficient machining becomes difficult.

Accordingly, as a method of performing more efficient and economic machining, a method disclosed in Japanese Patent Application Laid-Open No. 5-8148 is sometimes adopted. With this method, a machine tool capable at least of 3-axis control changes, during machining, the tool orientation of a tool whose blade edge is formed in an arc shape at the tip end with respect to a workpiece which is a machining target so as to uniformly use the entire cutting edge to thereby increase the tool life.

According to the machining method disclosed in Japanese Patent Application Laid-Open No. 5-8148, the cutting edge may be widely used and the tool life may be increased by a method of performing machining while changing the contact position of a ball end mill by a machining program for performing machining while changing the tool orientation as shown in FIG. 4.

However, as shown in FIG. 5, in the case where the main spindle rotation speed (rpm) and the feed speed (mm/min) are constant, with the method of widely using the cutting edge by changing the tool orientation, since the cutting speed (m/min) is different depending on the contact diameter of the blade edge of the tool 2, machined surfaces with different machining qualities are created. This may result in unstable machining of a heat-resistant alloy, especially, a nickel-based alloy.

With respect to a turbine blade whose main material is a nickel-based alloy and the like, it is important from the standpoint of its usage environment that the parts performance is not impaired under harsh conditions of high temperature and high pressure. Thus, the composition state of the machined surface where machining or the like is performed is strictly specified. The composition state varies greatly by the cutting speed (m/min) and the feed f (mm).

With the method as shown in FIG. 5 of widely using the cutting edge by changing the tool orientation, the cutting speed (m/min) varies greatly according to the contact diameter of the blade edge. In FIG. 5, for example, in the case of changing, for an R5.0 ball end mill, the tool orientation within the range of positions of 10° to 80° of the tool tip end, when the main spindle rotation speed (rpm) is 2000 (rpm), the cutting speed of the outer contact diameter at the 80° position is 62 (m/min), but the cutting speed at the 10° position is 11 (m/min). In this manner, since there is an about sixfold cutting speed difference depending on the tool orientation, there is a high possibility that the composition state of the machined surface is greatly affected, and a uniform machined surface quality is difficult to achieve.

As a method of achieving a uniform machined surface quality, a method disclosed in Japanese Patent Application Laid-Open No. 2002-96243 is sometimes adopted. This method is for performing continuous machining under an optimal machining condition where the cutting speed and the feed are constant, by attaching, to machining program data, the magnification between the distance from the contact point between a tool and a workpiece to the center of the tool and the radius of the tool and by performing re-calculation and re-instruction regarding the rotation speed and the feed speed by a numerical controller based on the magnification.

It is possible to achieve a uniform machined surface quality by a machining device that performs control of achieving a certain cutting speed (m/min) that is set for a tool diameter at a certain tool orientation by using the machining method disclosed in Japanese Patent Application Laid-Open No. 2002-96243. However, in the case where the tool 2 is a ball end mill, as shown in FIGS. 6A and 6B, due to its shape property, the radius is small and the main spindle rotation speed (rpm) is great at a position near the center of the tool. In FIGS. 6A and 6B, in the case of changing the tool orientation of a ball end mill with a radius of 5.0 within the range of positions of 10° to 80° of the tool tip end, if the main spindle rotation speed is 2000 (rpm) at the 80° position (outer contact diameter $\phi 9.848$) (FIG. 6A), the main spindle rotation speed is 11345 (rpm) at the 10° position (outer contact diameter $\phi 1.736$) (FIG. 6B).

When a big difference in the main spindle rotation speed (rpm) is caused depending on the tool orientation in this manner, there is a concern that a displacement difference based on increases in the temperature of the main spindle at the time of low rotation and at the time of high rotation affects the machining accuracy. Also, since the feed speed (mm/min) has to be increased or decreased in proportion to the main spindle rotation speed (rpm), the feed speed (mm/min) is made excessively great, and there is a possibility that the shaft movement may not follow due to the overspeed of the main spindle rotation speed or the excessive feed speed. To prevent the overspeed of the main spindle rotation speed or the excessive feed speed, the method described in Japanese Patent Application Laid-Open No. 2002-96243 may set the maximum rotation speed and the minimum rotation speed, but if the cutting speed is made constant, the tool use range will be limited, and this is not a realistic method.

As described above, a conventional machining device that controls a certain cutting speed (m/min) set while using a ball end mill is not practical for turbine blade machining.

Accordingly, in recent years, a barrel tool 8 as shown in FIG. 7 having a barrel radius R with a great radius of curvature at the tool side surface shape is sometimes used. Due to its shape property, this barrel tool 8 has a small difference between the minimum diameter and the maximum diameter at the tool tip end. As shown in FIGS. 8A to 8C, for example, in the case of using the range of $\phi 6.0$ to $\phi 8.0$ of a barrel tool 8 with $\phi 8.0$ whose radius of curvature is 100 mm, if the main spindle rotation speed at the position of $\phi 8.0$ is 2000 (rpm), the cutting speed of the outer contact surface $\phi 8.0$ is 50 (m/min), as shown in FIG. 8A. In the case of controlling a certain set cutting speed (m/min) as shown in FIG. 8B, the main spindle rotation speed is 2290 (rpm) at the position of $\phi 7.0$. In the case of controlling a certain set cutting speed (m/min) as shown in FIG. 8C, the main spindle rotation speed is 2667 (rpm) at the position of $\phi 6.0$.

By using such a barrel tool 8, the variation in the main spindle rotation speed (rpm) is reduced, and the displacement difference based on increases in the temperature of the main spindle at the time of low rotation and at the time of high rotation is reduced and the influence on the machining accuracy may be made small. Also, since the feed speed (mm/min) is increased or decreased in proportion to the main spindle rotation speed (rpm), a variation in the feed speed is also reduced, and the influence on the follow-up characteristic of the shaft movement is reduced.

However, in the case of machining the shape of a turbine blade, since the barrel tool 8 has a great radius of curvature on the tool side surface due to its shape property, the machining pitch (pick feed) by a conventional ball end mill is too small, and this may result in poor cutting due to insufficient biting of the tool blade edge resulting from an excessively small depth of cut. Thus, the machining pitch in the case of using the barrel tool 8 has to be increased compared with the machining pitch in the case of using a ball end mill. As a result, by increasing the machining pitch, the machining length is reduced and the machining time is reduced, but the depth of cut is increased by the increase in the machining range due to the large radius R of the barrel tool 8 and the large pitch, and the cutting heat that is generated is increased compared with the case of the ball end mill. In the case of machining a heat-resistant alloy, there is a problem that the cutting heat is accumulated in the tool and the tool life is reduced.

As a method for solving this problem, there is a method of creating a machining program by a CAD/CAM device for creating a machining program, by precisely specifying the machining orientation based on a machining position and re-calculating the machining program to thereby change the machining orientation. However, to create a machining program for changing the machining orientation, an expensive high-performance CAD/CAM device capable of defining a machining orientation by one machining instruction is necessary, and also an engineer with full knowledge of CAD/CAM operation is necessary. Moreover, even for an engineer with full knowledge of CAD/CAM operation, it is not easy to create a machining program in which the machining orientation is changed.

SUMMARY OF THE INVENTION

Accordingly, in view of the above conventional problems, the present invention aims to provide a machine tool including a linear movement axis for moving a main spindle, at least two linear movement axes for moving a table, a rotation table for fixing a workpiece, the rotation table including at least one rotation axis and placed on the table, and a numerical controller for controlling the main spindle, the linear movement axes, and the rotation axis, and for machining a workpiece fixed to the rotation table, the machine tool being capable of increasing the tool life by performing machining by causing a machining program for tool center point control based on a certain tool orientation to be executed and while changing the tool orientation based on set tool use range and tool orientation change waveform pattern.

A machine tool according to the present invention includes a linear movement axis for moving a main spindle, at least two linear movement axes for moving a table, a rotation table including at least one rotation movement axis, the rotation table being placed on the table, and a numerical controller for controlling the main spindle, the linear movement axes, and the rotation movement axis according to a machining program in which tool orientation is fixed, and for machining a workpiece fixed to the rotation table. This numerical controller includes a tool shape information storage section for storing tool shape information to be used, a reference machining orientation tool diameter storage section for storing a reference machining orientation tool diameter of a tool to be used in execution of the machining program in which tool orientation is fixed, a tool orientation change waveform storage section for storing a tool orientation change waveform pattern and the number of repetitions for periodically changing a tool orientation of the tool to be used in execution of the machining program, a machining direction vector storage section for storing a machining direction vector instructed by the machining program, a movement axis instruction storage section for reading the machining program and storing movement axis instructions for the linear movement axes and the rotation movement axis, a total machining height calculation section for calculating a total machining height for changing the tool orientation from the machining direction vector and the movement axis instruction, a movement axis instruction value calculation section for calculating, by a tool center point control function, a movement axis instruction value for each of the linear movement axes and the rotation movement axis, which are movement axes, based on the movement axis instruction, a movement axis instruction value addition amount calculation section for calculating an addition amount to each movement axis instruction value for changing the tool orientation, based on the tool shape information, the reference machining orientation tool diameter, the tool orientation change waveform, and the total machining height, a movement axis instruction value adding section for adding the addition amount calculated by the movement axis instruction value addition amount calculation section to each movement axis instruction value calculated by the movement axis instruction value calculation section, and a control section for performing operation according to each movement axis instruction value to which the addition amount is added by the movement axis instruction value adding section.

The machining direction vector may be an element for determining an axis direction of the tool orientation change waveform in the changing of the tool orientation.

The total machining height may be an element for determining a range of the tool orientation change waveform in the changing of the tool orientation.

According to the present invention, there may be provided a machine tool including a linear movement axis for moving a main spindle, at least two linear movement axes for moving a table, a rotation table for fixing a workpiece, the rotation table including at least one rotation axis and placed on the table, and a numerical controller for controlling the main spindle, the linear movement axes, and the rotation axis, and for machining the workpiece, the machine tool being capable of increasing the tool life by performing machining by causing a machining program for tool center point control based on a certain tool orientation to be executed and while changing the tool orientation based on set tool use range and tool orientation change waveform pattern.

BRIEF DESCRIPTION OF THE DRAWINGS

The above-described and other objects and features of the present invention will be made clear from the description of the embodiment given below with reference to the appended drawings. Of these drawings:

FIGS. 1A and 1B are diagrams showing machining of a turbine blade, wherein FIG. 1A shows the shape of a turbine blade, and FIG. 1B is a diagram for describing the machining path in the turbine blade machining;

FIGS. 2A and 2B are diagrams concretely showing the tool orientation with respect to a machined surface, wherein FIG. 2A is side view regarding a tool orientation and a diagram showing the tool orientation (a lead angle) in an enlarged manner, and FIG. 2B is plan view regarding a tool orientation and a diagram showing the tool orientation (a tilt angle) in an enlarged manner;

FIG. 4 is a diagram for describing a method of machining while changing the tool orientation (tool orientations 80°, 45°, 10°);

FIG. 5 is a diagram for describing a change in the cutting speed in machining where the tool orientation is changed with respect to the machined surface in the turbine blade machining shown in FIG. 1;

FIGS. 8A to 8C are diagrams for describing a method of machining that is performed using a barrel tool and while changing the tool orientation;

FIG. 9 is a perspective view of the appearance of an embodiment of a machine tool according to the present invention;

FIG. 10 is an enlarged partial view of FIG. 9;

FIGS. 11A and 11B are diagrams showing examples of results of calculation of a change in the tool orientation with respect to FIGS. 13A to 13D, and FIG. 14;

FIG. 13A is a diagram showing an example program format;

FIG. 13B is a diagram showing an example program instruction;

FIG. 13C is a diagram showing the orientation of a barrel tool;

FIG. 13D is a diagram showing barrel tool dimensions;

DETAILED DESCRIPTION OF THE PREFERRED EMBODIMENTS

Figure 1A:
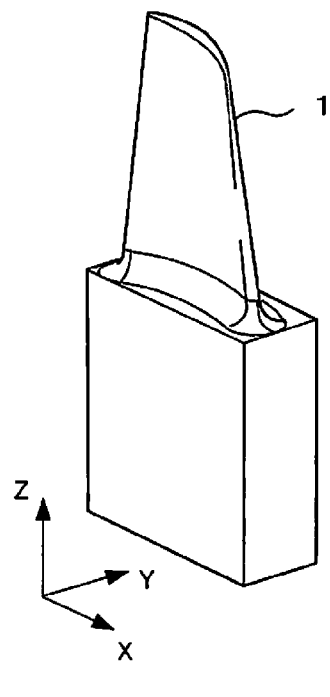
Figure 1B:
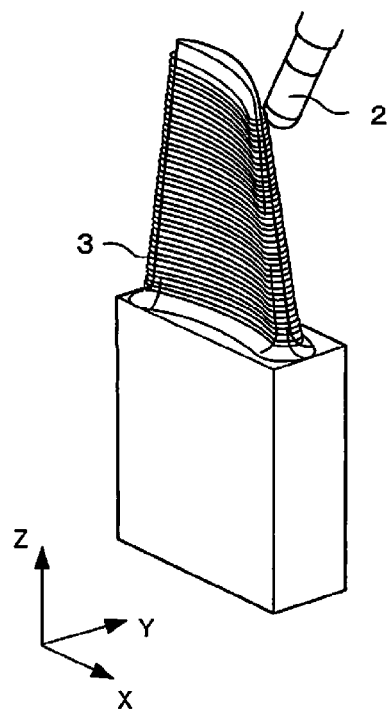
Figure 3:
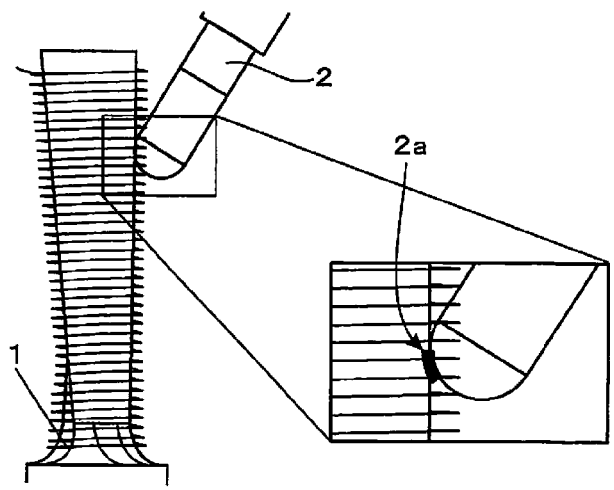
FIG. 3 is a diagram showing, with respect to the turbine blade machining shown in FIG. 1, machining at a tool orientation that is fixed with respect to the machined surface (a diagram showing the machining path from the front), and a diagram showing a part of the machining path in an enlarged manner.
Figure 2A:
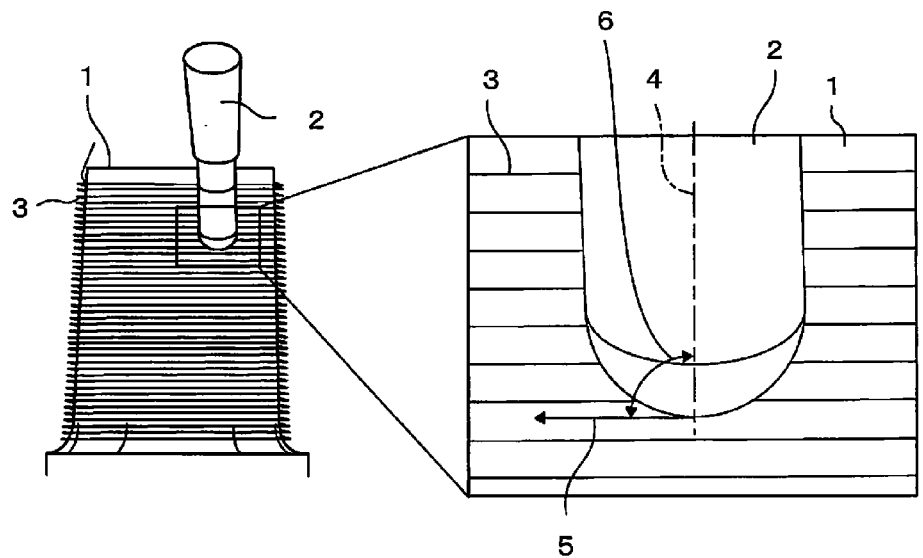
Figure 2B:
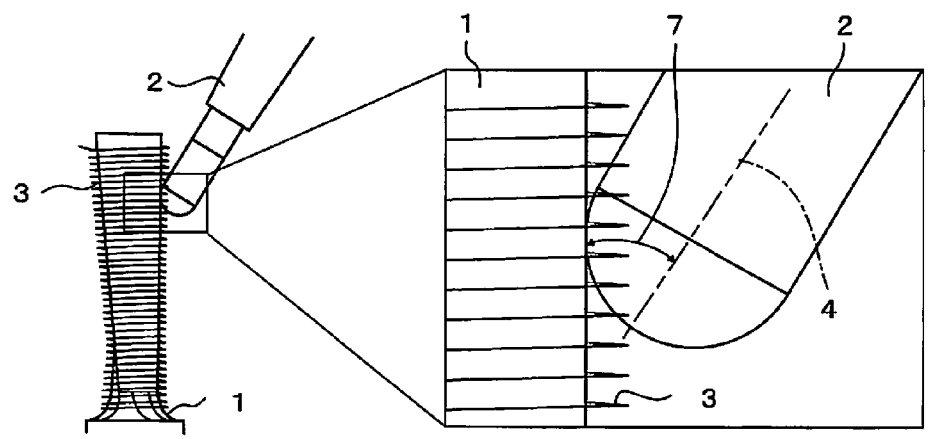
Figure 6A:
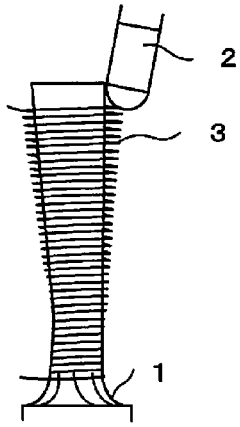
FIGS. 6A and 6B are diagrams for describing a change in the machining conditions where the cutting speed is constant.
Figure 6B:
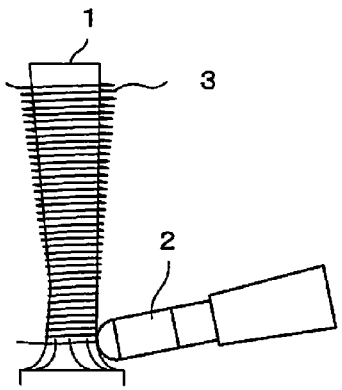
Figure 7:
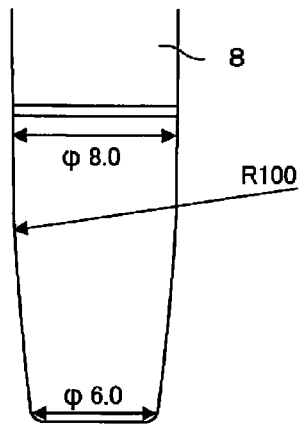
FIG. 7 is a diagram showing a barrel tool.

An embodiment of a machine tool according to the present invention will be described with reference to FIG. 9 (perspective view of appearance) and FIG. 10 (enlarged partial view).

A machine tool 20 is configured from a bed 21, a column 24 that is arranged at the back of the bed 21 in a standing manner, a table 22 placed at the center of the bed 21, a rotation table 23 that is placed on the table 22 and that is capable of rotating around two axes, a main spindle head 25 attached at the upper portion of the column 24, and a main spindle 26 that is fixed to the main spindle head 25. A barrel tool 8 is attached to the main spindle 26. The barrel tool 8 is rotated by a motor. The main spindle head 25 is capable of moving in a vertical direction along a linear movement axis (Z-axis).

The table 22 is capable of moving along two linear movement axes (X-axis, Y-axis). Also, the rotation table 23 placed on the table 22 is capable of rotating around two rotation axes (B-axis, C-axis). Each axis of the machine tool is controlled by a numerical controller (not shown), and machining of a workpiece 27 (for example, machining of a turbine blade) is carried out.

Figure 12:
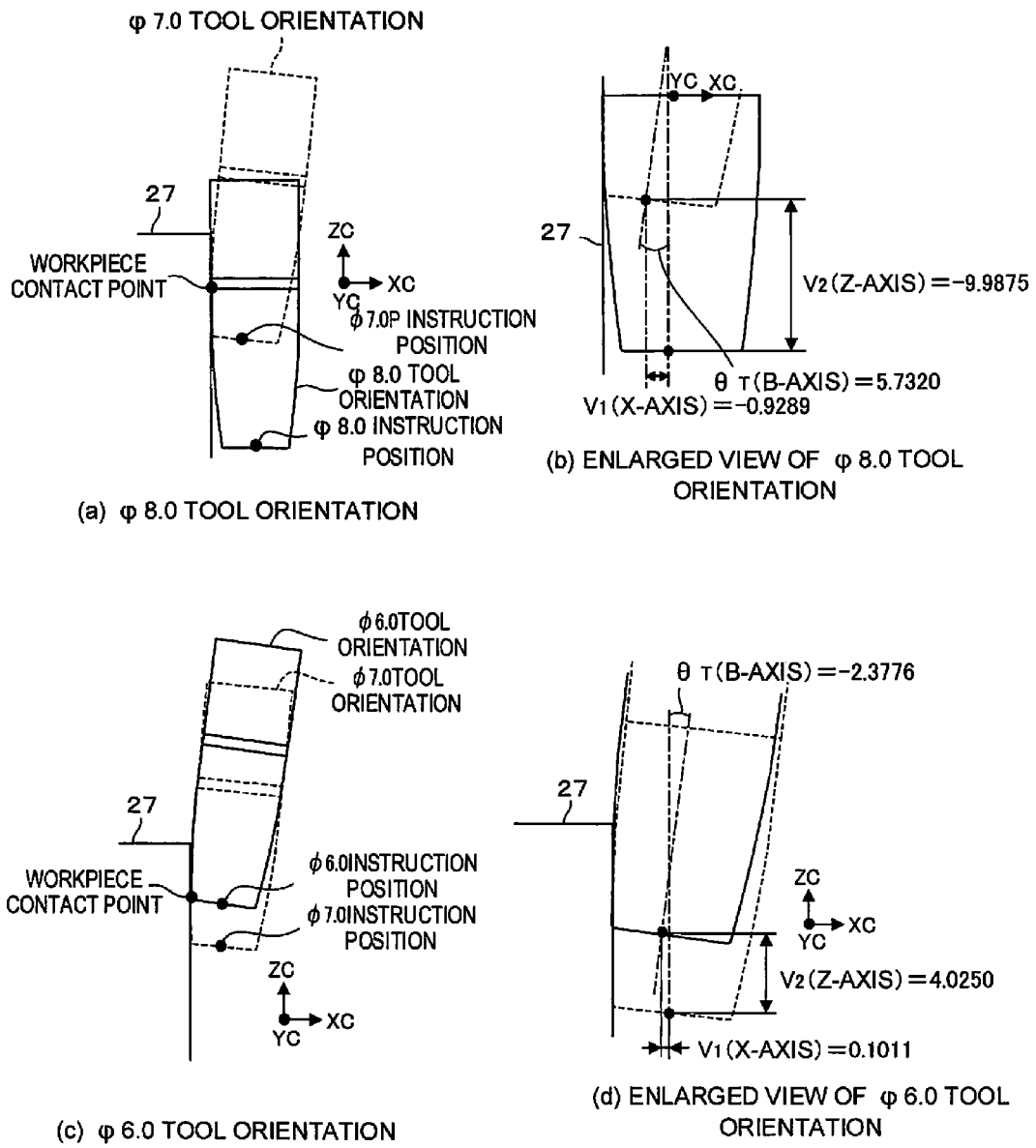
FIG. 12 is a diagram for describing the calculation results in FIGS. 11A and 11B in detail.

In the machining of a turbine blade by the machine tool of the present invention, the barrel tool 8 is used instead of a ball end mill so as to provide a practical machining method. In this case, if machining is performed by using a machining program for tool center point control based on a certain tool orientation, the cut range is wide due to the shape property of the barrel tool 8, and thus there is a problem of accumulation of cutting heat, which is a cause of reduction in the tool life. As shown in FIGS. 11A and 11B, as a method of dissipating the cutting heat, the tool contact position is changed by changing, within a range set in advance, the orientation of the tool that is used in order to dissipate the cutting heat that to be generated. Accumulation of the cutting heat in the barrel tool 8 is thereby prevented. Additionally, FIGS. 11A and 11B are diagrams showing examples of a calculation result of a change in the tool orientation in FIGS. 13A to 13D and FIG. 14. Also, FIG. 12 is a diagram for describing the calculation results in FIGS. 11A and 11B in detail.

To realize the machining described above, the machine tool 20 changes, by a numerical controller 29 (see FIG. 17) for executing the machining program for tool center point control based on a certain tool orientation, the tool orientation of the barrel tool 8 based on set tool use range and tool orientation change waveform pattern, and thus it is possible to increase the life of a tool to be used in the machining of a turbine blade whose main material is a heat-resistance alloy, such as a nickel-based alloy, by simple operation and setting.

FIG. 13A is a diagram showing an example program format.

A program format function ON (101) for starting control of the machine tool according to the present invention is expressed by an M code "M303", and instructions are given by R, D, B, S, E, V, W, and K as arguments. Each argument is described as follows: R is a barrel radius, D is a tool diameter, B is a reference machining orientation tool diameter, S is a tool use range (start), E is a tool use range (end), V is a machining direction vector, W is a tool orientation change waveform pattern, and K is the number of times of orientation change.

FIG. 13B is a diagram showing an example program instruction.

A machining program (O1000) 9 for performing control of the machine tool according to the present invention includes the program format function ON (101), a machining path program 10, and a program format function OFF (102).

FIG. 13C is a diagram showing the orientation of a barrel tool, and FIG. 13D is a diagram showing barrel tool dimensions.

Tool shape information of the barrel tool 8 includes the barrel radius R, the tool diameter D, the tool use range (start) S, and the tool use range (end) E, as shown in FIG. 13D. The reference machining orientation tool diameter B is a reference tool diameter when the tool orientation is constant. These pieces of information are stored, at the time of execution of the machining program 9, in a storage device provided to the numerical controller for controlling a machine tool. Additionally, the reference sign d1 in FIG. 13D indicates a reference tool diameter when the tool orientation is constant, and the reference sign p1 indicates a machining path program instruction position.

Figure 14:
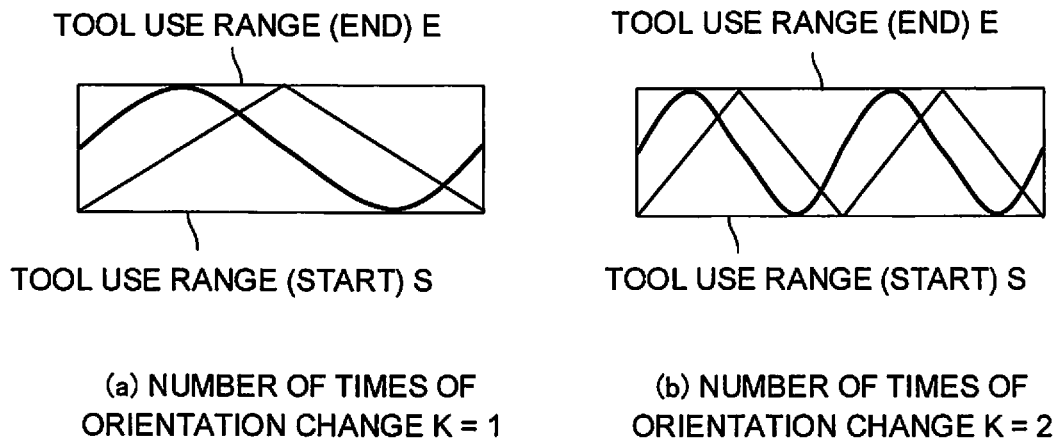
FIG. 14 is a diagram showing a tool use range and a tool orientation change waveform.

FIG. 14 is a diagram showing a tool use range and a tool orientation change waveform.

In the machining by the machine tool according to the present invention, the barrel tool 8 machines the workpiece 27 while having the tool orientation changed within the range from the tool use range (start) S to the tool use range (end) E. Patterns of change in the orientation of the barrel tool 8 includes two types of a linear orientation change pattern instructed by W=1, and a sine-wave orientation change pattern instructed by W=2. The number of times the barrel tool 8 is to change the orientation between the tool use range (start) S and the tool use range (end) E is instructed by the number of times of orientation change K. In FIG. 14, (a) shows a case where the number of times of orientation change is one (K=1), and (b) shows a case where the number of times of orientation change is two (K=2).

As shown in FIG. 13B, the M303 instruction, which is the "program format function ON (101)" to be instructed before the "machining path program (10)" in the machining program 9, is issued with the arguments of the barrel radius R, the tool diameter D, the reference machining orientation tool diameter B, the tool use range (start) S, the tool use range (end) E, the machining direction vector V, the tool orientation change waveform pattern W, and the number of times of orientation change K, and then after the "machining path program (10)", an M305 instruction, which is the "program format function OFF (102)", is issued.

Figure 15:
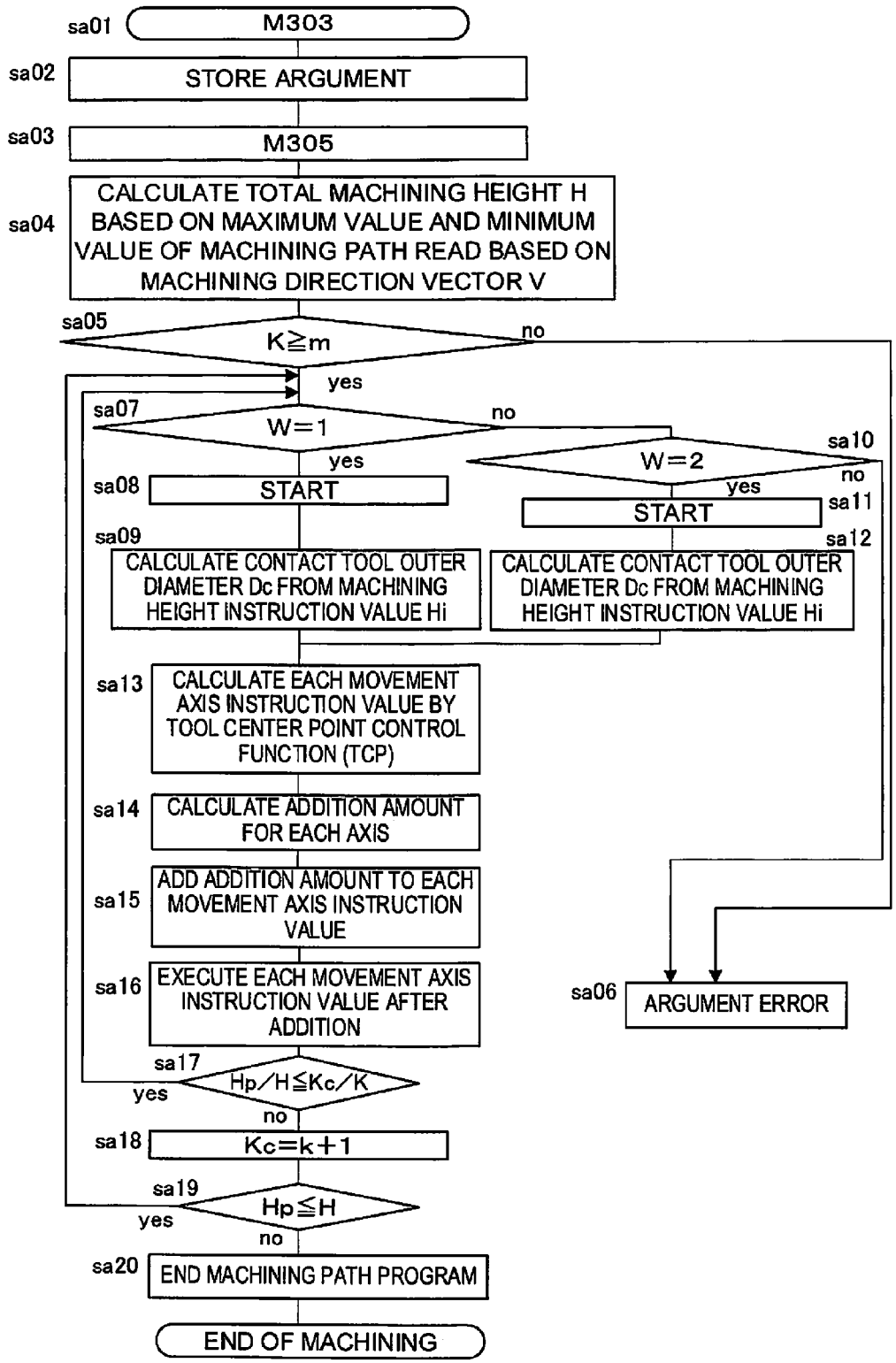
FIG. 15 is a flow chart showing a process of performing machining by controlling the machine tool of the present invention and changing the tool orientation.

FIG. 15 is a flow chart showing a process of performing machining by controlling the machine tool of the present invention and changing the tool orientation.

The arguments are stored in the numerical controller (step sa02) by the M303 (step sa01), which is the "program format function ON (101)". The arguments to be stored are the barrel radius R, the tool diameter D, the reference machining orientation tool diameter B, the tool use range (start) S, the tool use range (end) E, the machining direction vector V, the tool orientation change waveform pattern W, and the number of times of orientation change K.

Next, all of the "machining path program (10)" up to the M305, which is the "program format function OFF (102)", is read (step sa03).

Next, a total machining height H is calculated by Expression (1) below based on the maximum value $H_{MAX}$ of machining height and the minimum value $H_{MIN}$ of machining height in the "machining path program (10)" read based on the machining direction vector V (step sa04). Expressions (2), (3), and (4) below are expressions for determining the total machining heights where the machining direction vectors are V=1, 2, and 3. In this case, V=1 corresponds to the X-axis, V=2 to the Y-axis, and V=3 to the Z-axis.

$$H = H_{MAX} - H_{MIN} \tag{1}$$

In the case of the machining direction vector V=1, $$H = X_{MAX} - X_{MIN} \tag{2}$$

In the case of the machining direction vector V=2, $$H = Y_{MAX} - Y_{MIN} \tag{3}$$

In the case of the machining direction vector V=3, $$H = Z_{MAX} - Z_{MIN} \tag{4}$$

The accumulated number of times of orientation change is given as Kc, where Kc=k (k=1, 2, 3, . . . , n), and its initial value is one.

Next, argument error check based on the number of times of orientation change K (step sa05), and argument error check based on the tool orientation change waveform pattern W (steps sa07, sa10) are performed. Also, the initial value of the accumulated number of times of orientation change Kc is given as one. In the case where the result of the argument error check indicates an argument error, an error is output (step sa06).

In the case where the tool orientation change waveform pattern W is one (step sa07), a machining operation is started by the "machining path program (10)" (step sa08), and a contact tool outer diameter Dc is calculated from a machining height instruction value Hi (step sa09). The machining height instruction value Hi at this time is determined by a linear movement axis instruction that is read based on the machining direction vector V. A machining position Hp is calculated based on the machining height instruction value Hi between the maximum value $H_{MAX}$ of machining height and the minimum value $H_{MIN}$ of machining height on the linear movement axis which has been read. Additionally, as shown in FIG. 14, with respect to the contact tool outer diameter Dc, there are two types of the tool orientation change waveform patterns W, namely, the linear orientation change pattern and the sine-wave orientation change pattern.

In the case of the tool orientation change waveform pattern W=1 (linear orientation change pattern), the contact tool outer diameter Dc is calculated from the machining height instruction value Hi in step sa09.

In the case of the machining direction vector V=1, the machining height instruction value Hi is calculated by Expression (5) below.

$$H_i = X_i \quad (5)$$

In the case of the machining direction vector V=2, the machining height instruction value Hi is calculated by Expression (6) below.

$$H_i = Y_i \quad (6)$$

In the case of the machining direction vector V=3, the machining height instruction value Hi is calculated by Expression (7) below.

$$H_i = Z_i \quad (7)$$

The machining position Hp is calculated by Expression (8) below.

$$H_p = H_{MAX} - H_i \quad (8)$$

(i=MAX, 1, 2, 3 . . . , MIN)

The contact tool outer diameter Dc is calculated by Expression (9) below.

$$D_c = S + \left( (E-S) - \left| 2(E-S)\left(\frac{H_P}{H}K - (K_c - 1)\right) - (E-S) \right| \right) \quad (9)$$

In the case of the tool orientation change waveform pattern W=2 (sine-wave orientation change pattern) (step sa10), the contact tool outer diameter Dc is calculated from the machining height instruction value Hi in step sa11.

In the case of the machining direction vector V=1, the machining height instruction value Hi is calculated by Expression (5).

In the case of the machining direction vector V=2, the machining height instruction value Hi is calculated by Expression (6).

In the case of the machining direction vector V=3, the machining height instruction value Hi is calculated by Expression (7).

The machining position Hp is calculated by Expression (8).

The contact tool outer diameter Dc is calculated by Expression (10) below.

$$D_c = S + \frac{(E-S)}{2}\left(1 + \sin\left(360 \times \left(\frac{H_P}{H}K - (K_c - 1)\right)\right)\right) \quad (10)$$

Each movement axis instruction value is calculated by a tool center point control function (step sa13), and a tilt axis addition value $\theta_T$, a first movement axis addition value $V_1$, and a second movement axis addition value $V_2$ are calculated based on the contact tool outer diameter Dc calculated in step sa09 or sa12, by Expressions (11) to (26) below, from the tool position and the tilt angle that change based on the value of the contact tool outer diameter Dc (step sa14). The addition values calculated are added to respective movement axis instruction values (step sa15), and each axis of the machine is operated by each movement axis instruction value to which the addition amount is added (step sa16).

Repetition is determined based on the ratio of the number of times of orientation change K and the accumulated number of times of orientation change Kc, and the ratio of the machining position Hp and the machining height instruction value H, and the tool orientation change waveform pattern is repeated by the set number of times of orientation change K (steps sa17 to sa20).

For example, as shown in FIGS. 11A and 11B, in the case of a machining program with a machining path program where the tool orientation is made constant at a φ7.0 position where a φ8.0 barrel tool is used, if φ6.0 to φ8.0 is given as the tool orientation range, the machining position is calculated by the flow chart shown in FIG. 15 and Expressions (11) to (26) below.

In Expressions (14) to (24) below, the addition values (the addition amounts) that change depending on the contact tool outer diameter Dc are given as a first movement axis tool position addition value $V_{1A}$, and a second movement axis tool position addition value $V_{2A}$, and the addition values (the addition amounts) according to the angle change calculated from the contact tool outer diameter Dc and the reference machining orientation tool diameter B are given as a first movement axis angular position addition value $V_{1B}$, and a second movement axis angular position addition value $V_{2B}$.

Figure 16:
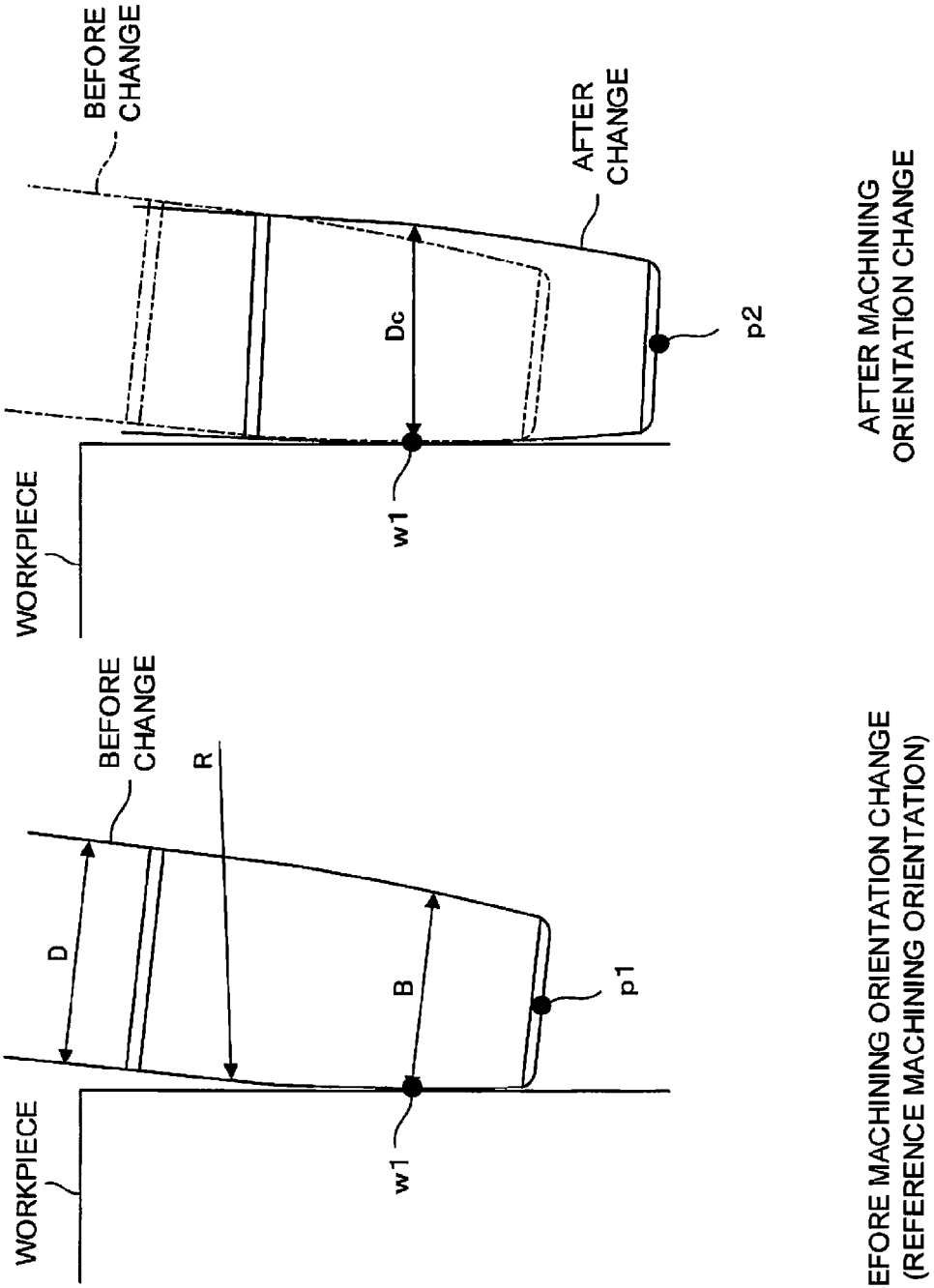
FIG. 16 is a diagram for describing a calculation formula for calculating an addition amount for each movement axis instruction.

Additionally, in FIG. 16, the reference sign w1 indicates a workpiece contact point, p1 indicates a machining path program instruction position, and p2 indicates a new machining path program instruction position.

These two types of addition values ($V_{1A}$, $V_{2A}$, $V_{1B}$, $V_{2B}$) are determined by Expressions (11) to (24) based on tool information stored by the M303, which is the "program format function ON (101)", and the first movement axis addition value $V_1$ and the second movement axis addition value $V_2$ are calculated by Expressions (25) and (26) using the two types of addition values (addition amounts).

A contact tool outer diameter angle $\theta_{Dc}$ is calculated by Expression (11) below.

$$\theta_{Dc} = \cos^{-1}\left(1 - \frac{D - D_c}{2R}\right) \quad (11)$$

A reference machining orientation tool outer diameter angle $\theta_B$ is calculated by Expression (12) below.

$$\theta_B = \cos^{-1}\left(1 - \frac{D - D}{2R}\right) \quad (12)$$

$\theta_T$ is calculated by Expression (13) below.

$$\theta_T = \theta_B - \theta_{D_c} \tag{13}$$

A total length L is calculated by Expression (14) below.

$$L = \sqrt{R^2 - \left(R - \left(\frac{D-S}{2}\right)\right)^2} \tag{14}$$

A reference length $L_B$ is calculated by Expression (15) below.

$$L_B = L - \sqrt{R^2 - \left(R - \left(\frac{D-B}{2}\right)\right)^2} \tag{15}$$

A reference radius $R_B$ is calculated by Expression (16) below.

$$R_B = \sqrt{L_B^2 + \left(\frac{B}{2}\right)^2} \tag{16}$$

A reference angle $\alpha_B$ is calculated by Expression (17) below.

$$\alpha_B = \tan^{-1}\left(\frac{2L_B}{B}\right) \tag{17}$$

A changed length $L_{D_c}$ is calculated by Expression (18) below.

$$L_{D_c} = L - \sqrt{R^2 - \left(R - \left(\frac{D-D_c}{2}\right)\right)^2} \tag{18}$$

A changed radius $R_{D_c}$ is calculated by Expression (19) below.

$$R_{D_c} = \sqrt{L_{D_c}^2 + \left(\frac{D_c}{2}\right)^2} \tag{19}$$

A changed angle $\alpha_{D_c}$ is calculated by Expression (20) below.

$$\alpha_{D_c} = \tan^{-1}\left(\frac{2L_{D_c}}{D_c}\right) \tag{20}$$

The first movement axis tool position addition value $V_{1A}$ is calculated by Expression (21) below.

$$V_{1A} = R_B \times \cos(\alpha_B + \theta_B) - R_{D_c} \times \cos(\alpha_{D_c} + \theta_B) \tag{21}$$

The second movement axis tool position addition value $V_{2A}$ is calculated by Expression (22) below.

$$V_{2A} = R_B \times \sin(\alpha_B + \theta_B) - R_{D_c} \times \sin(\alpha_{D_c} + \theta_B) \tag{22}$$

The first movement axis angular position addition value $V_{1B}$ is calculated by Expression (23) below.

$$V_{1B} = R_{D_c} \times \cos(\alpha_{D_c} + \theta_B) - R_{D_c} \times \cos(\alpha_{D_c} + \theta_{D_c}) \tag{23}$$

The second movement axis angular position addition value $V_{2B}$ is calculated by Expression (24) below.

$$V_{2B} = R_{D_c} \times \sin(\alpha_{D_c} + \theta_B) - R_{D_c} \times \sin(\alpha_{D_c} + \theta_{D_c}) \tag{24}$$

$V_1$ is calculated by Expression (25) below.

$$V_1 = V_{1A} + V_{1B} \tag{25}$$

$V_2$ is calculated by Expression (26) below.

$$V_2 = V_{2A} + V_{2B} \tag{26}$$

In the examples of calculation of a change in the tool orientation shown in FIGS. 11A and 11B, the machine tool 20 (see FIGS. 9 and 10) includes three linear movement axes, X-axis, Y-axis and Z-axis, and two rotation axes, B-axis and C-axis, with the B-axis being a tilt axis that is parallel to the Y-axis direction and the C-axis being a rotation axis that is parallel to the Z-axis direction, where the rotation is in the clockwise direction for both axes.

Figure 17:
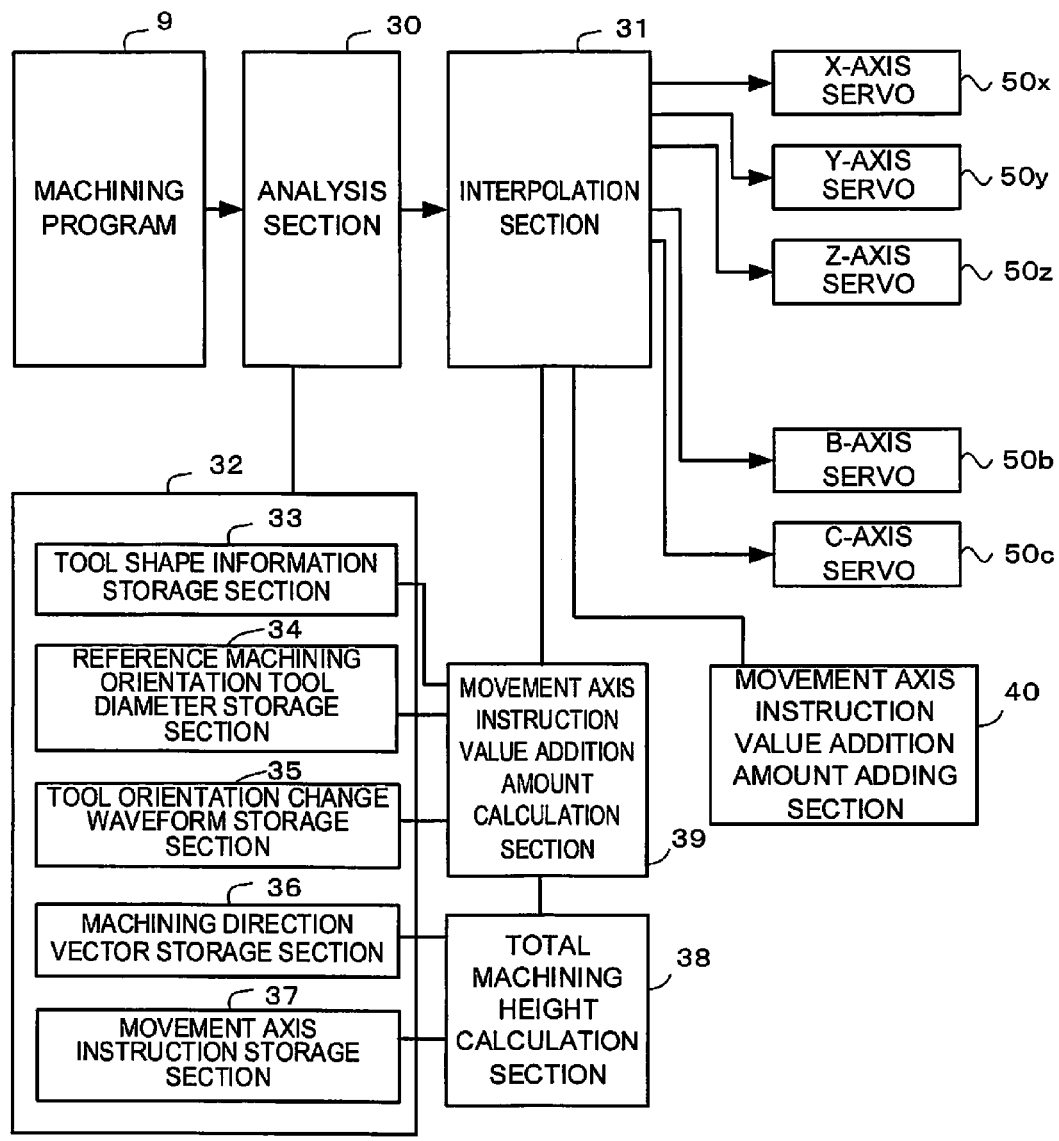
FIG. 17 is a block diagram of a numerical controller for controlling the machine tool according to the present invention.

The numerical controller for controlling the machine tool according to the present invention will be described with reference to FIG. 17.

The machining program 9 is analyzed by an analysis section 30 and is interpolated by an interpolation section 31, and servos 50x, 50y, 50z, 50b, and 50c of respective axes of the machine tool are driven. The interpolation section 31 calculates, by the tool center point control function, the movement axis instruction value of each movement axis (linear movement axes, rotation movement axis) based on a movement axis instruction issued by the machining program 9.

A storage unit 32 includes a tool shape information storage section 33 for storing tool shape information to be used, the tool shape information being acquired by analysis of the machining program 9 by the analysis section 30, a reference machining orientation tool diameter storage section 34 for storing the contact tool diameter of a tool to be used in relation to a machining program in which tool orientation is fixed, a tool orientation change waveform storage section 35 for storing the tool orientation change waveform pattern and the number of repetitions for periodically changing the tool orientation of the tool to be used in execution of the machining program 9, a machining direction vector storage section 36 for storing a machining direction vector instructed by the machining program 9, and a movement axis instruction storage section 37 for reading the machining program 9 and storing movement axis instructions for the linear movement axes and the rotation movement axis.

A total machining height calculation section 38 calculates a total machining height for changing the tool orientation from the machining direction vector stored in the machining direction vector storage section 36 and the movement axis instruction stored in the movement axis instruction storage section 37. A movement axis instruction value addition amount calculation section 39 calculates the addition amount to each movement axis instruction value for changing the tool orientation, based on the tool shape information stored in the tool shape information storage section 33, the contact tool diameter stored in the reference machining orientation tool diameter storage section 34, the tool orientation change waveform stored in the tool orientation change waveform storage section 35, and the total machining height output from the total machining height calculation section 38. A movement axis instruction value addition amount adding section 40 adds the addition amount calculated by the movement axis instruction value addition amount calculation section 39 to each movement axis instruction value calculated by a movement axis instruction value calculation section (the interpolation section 31).

Each movement axis instruction value determined by the movement axis instruction value addition amount adding section 40 drives a driving section (a servomotor) of the machine tool by each axial servo (the X-axis servo 50x, the Y-axis servo 50y, the Z-axis servo 50z, the B-axis servo 50b, the C-axis servo 50c), which is a control section for controlling the operation.

As described above, according to the present invention, it is possible to prevent accumulation of cutting heat and to increase the tool life by causing a numerical controller for controlling a machine tool to perform machining by changing the tool orientation (changing the tool contact position based on a certain waveform), by storing, based on a machining program in which the tool orientation is fixed to a certain axis or a certain surface, a machining program track, the barrel radius R of a barrel tool to be used, the reference tool diameter D, the reference machining orientation tool diameter B, the tool use range, the machining direction vector V, the tool orientation change waveform pattern W, and the number of times of orientation change K, calculating the machining position at the time of changing the tool orientation based on the stored pieces of information, and performing an operation by adding the calculated result to each movement axis instruction.

What is claimed is:

1. A machine tool comprising:
   a linear movement axis for moving a main spindle;
   at least two linear movement axes for moving a table;
   a rotation table including at least one rotation movement axis, the rotation table being placed on the table; and
   a numerical controller for controlling the main spindle, the linear movement axes, and the rotation movement axis according to a machining program in which tool orientation is fixed, and for machining a workpiece fixed to the rotation table,
   wherein the numerical controller includes
      a tool shape information storage section for storing tool shape information to be used,
      a reference machining orientation tool diameter storage section for storing a reference machining orientation tool diameter of a tool to be used in execution of the machining program in which tool orientation is fixed,
      a tool orientation change waveform storage section for storing a tool orientation change waveform pattern and the number of repetitions for periodically changing a tool orientation of the tool to be used in execution of the machining program,
      a machining direction vector storage section for storing a machining direction vector instructed by the machining program,
      a movement axis instruction storage section for reading the machining program and storing movement axis instructions for the linear movement axes and the rotation movement axis,
      a total machining height calculation section for calculating a total machining height for changing the tool orientation from the machining direction vector and the movement axis instruction,
      a movement axis instruction value calculation section for calculating, by a tool center point control function, a movement axis instruction value for each of the linear movement axes and the rotation movement axis, which are movement axes, based on the movement axis instruction,
      a movement axis instruction value addition amount calculation section for calculating an addition amount to each movement axis instruction value for changing the tool orientation, based on the tool shape information, the reference machining orientation tool diameter, the tool orientation change waveform, and the total machining height,
      a movement axis instruction value adding section for adding the addition amount calculated by the movement axis instruction value addition amount calculation section to each movement axis instruction value calculated by the movement axis instruction value calculation section, and
      a control section for performing operation according to each movement axis instruction value to which the addition amount is added by the movement axis instruction value adding section.

2. The machine tool according to claim 1, wherein the machining direction vector is an element for determining an axis direction of the tool orientation change waveform in the changing of the tool orientation.

3. The machine tool according to claim 1, wherein the total machining height is an element for determining a range of the tool orientation change waveform in the changing of the tool orientation.

* * * * *